(12) United States Patent
Ackley

(10) Patent No.: US 9,804,013 B2
(45) Date of Patent: Oct. 31, 2017

(54) MOBILE DIMENSIONER APPARATUS FOR USE IN COMMERCE

(71) Applicant: Hand Held Products, Inc., Fort Mill, SC (US)

(72) Inventor: H. Sprague Ackley, Seattle, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 159 days.

(21) Appl. No.: 14/793,149

(22) Filed: Jul. 7, 2015

(65) Prior Publication Data

US 2017/0010141 A1    Jan. 12, 2017

(51) Int. Cl.

| | |
|---|---|
| *G01F 17/00* | (2006.01) |
| *G01F 25/00* | (2006.01) |
| *G01B 11/00* | (2006.01) |
| *G01B 11/02* | (2006.01) |
| *G05B 19/00* | (2006.01) |
| *G07B 17/00* | (2006.01) |

(52) U.S. Cl.
CPC .............. *G01F 17/00* (2013.01); *G01B 11/00* (2013.01); *G01B 11/02* (2013.01); *G01F 25/0084* (2013.01); *G05B 19/00* (2013.01); *G07B 2017/00685* (2013.01)

(58) Field of Classification Search
CPC ......... G01F 17/00; G01B 11/00; G01B 11/02; G05B 19/00; G02F 25/0084; G06K 9/4604; G06K 9/52; G06T 7/62; G07B 2017/00685; G07B 17/00661
See application file for complete search history.

(56) References Cited

U.S. PATENT DOCUMENTS

| | | | |
|---|---|---|---|
| 3,971,065 | A | 7/1976 | Bayer |
| 4,026,031 | A | 5/1977 | Siddall et al. |
| 4,279,328 | A | 7/1981 | Ahlbom |
| 4,398,811 | A | 8/1983 | Nishioka et al. |
| 4,495,559 | A | 1/1985 | Gelatt, Jr. |
| 4,730,190 | A | 3/1988 | Win et al. |
| 4,803,639 | A | 2/1989 | Steele et al. |
| 5,184,733 | A | 2/1993 | Amarson et al. |
| 5,198,648 | A | 3/1993 | Hibbard |

(Continued)

FOREIGN PATENT DOCUMENTS

| | | |
|---|---|---|
| AU | 2004212587 A1 | 4/2005 |
| DE | 3335760 A1 | 4/1985 |

(Continued)

OTHER PUBLICATIONS

Office Action in counterpart European Application No. 13186043.9 dated Sep. 30, 2015, pp. 1-7.

(Continued)

*Primary Examiner* — Michael P Lapage
(74) *Attorney, Agent, or Firm* — Additon, Higgins & Pendleton, P.A.

(57) ABSTRACT

A mobile volume dimensioning device, i.e. a mobile dimensioner, is described that detects excessive measuring time and/or a repetitive range of measuring motion and receives a deactivation event upon detection of this inappropriate behavior so as to prevent the systematic reporting of either the highest or lowest dimensions in an effort to mitigate unfair charging practices in commerce applications involving the shipping of goods.

7 Claims, 9 Drawing Sheets

(56) References Cited

U.S. PATENT DOCUMENTS

| | | |
|---|---|---|
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |

(56) References Cited

U.S. PATENT DOCUMENTS

| | | |
|---|---|---|
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |

(56) References Cited

U.S. PATENT DOCUMENTS

| | | | |
|---|---|---|---|
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,359 B2 | 6/2015 | Caballero et al. | |
| 9,047,420 B2 | 6/2015 | Caballero | |
| 9,047,525 B2 | 6/2015 | Barber et al. | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,053,380 B2 | 6/2015 | Xian et al. | |
| 9,057,641 B2 | 6/2015 | Amundsen et al. | |
| 9,058,526 B2 | 6/2015 | Powilleit | |
| 9,064,165 B2 | 6/2015 | Havens et al. | |
| 9,064,167 B2 | 6/2015 | Xian et al. | |
| 9,064,168 B2 | 6/2015 | Todeschini et al. | |
| 9,064,254 B2 | 6/2015 | Todeschini et al. | |
| 9,066,032 B2 | 6/2015 | Wang | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 9,082,195 B2 | 7/2015 | Holeva et al. | |
| 9,142,035 B1* | 9/2015 | Rotman | G06T 7/62 |
| 9,171,278 B1 | 10/2015 | Kong et al. | |
| 9,233,470 B1 | 1/2016 | Bradski et al. | |
| 9,235,899 B1 | 1/2016 | Kirmani et al. | |
| 9,299,013 B1 | 3/2016 | Curlander et al. | |
| 9,424,749 B1 | 8/2016 | Reed et al. | |
| 9,486,921 B1 | 11/2016 | Straszheim et al. | |
| 2001/0027995 A1 | 10/2001 | Patel et al. | |
| 2001/0032879 A1 | 10/2001 | He et al. | |
| 2002/0054289 A1 | 5/2002 | Thibault et al. | |
| 2002/0067855 A1 | 6/2002 | Chiu et al. | |
| 2002/0109835 A1 | 8/2002 | Goetz | |
| 2002/0118874 A1 | 8/2002 | Chung et al. | |
| 2002/0158873 A1 | 10/2002 | Williamson | |
| 2002/0167677 A1 | 11/2002 | Okada et al. | |
| 2002/0179708 A1 | 12/2002 | Zhu et al. | |
| 2002/0196534 A1 | 12/2002 | Lizotte et al. | |
| 2003/0038179 A1 | 2/2003 | Tsikos et al. | |
| 2003/0053513 A1 | 3/2003 | Vatan et al. | |
| 2003/0063086 A1 | 4/2003 | Baumberg | |
| 2003/0078755 A1 | 4/2003 | Leutz et al. | |
| 2003/0091227 A1 | 5/2003 | Chang et al. | |
| 2003/0156756 A1 | 8/2003 | Gokturk et al. | |
| 2003/0197138 A1 | 10/2003 | Pease et al. | |
| 2003/0225712 A1* | 12/2003 | Cooper | G01B 11/04 705/407 |
| 2003/0235331 A1 | 12/2003 | Kawaike et al. | |
| 2004/0008259 A1 | 1/2004 | Gokturk et al. | |
| 2004/0019274 A1 | 1/2004 | Galloway et al. | |
| 2004/0024754 A1 | 2/2004 | Mane et al. | |
| 2004/0066329 A1 | 4/2004 | Zeitfuss et al. | |
| 2004/0073359 A1 | 4/2004 | Ichijo et al. | |
| 2004/0083025 A1 | 4/2004 | Yamanouchi et al. | |
| 2004/0089482 A1* | 5/2004 | Ramsden | G01G 19/005 177/1 |
| 2004/0098146 A1 | 5/2004 | Katae et al. | |
| 2004/0105580 A1 | 6/2004 | Hager et al. | |
| 2004/0118928 A1 | 6/2004 | Patel et al. | |
| 2004/0122779 A1 | 6/2004 | Stickler et al. | |
| 2004/0155975 A1 | 8/2004 | Hart et al. | |
| 2004/0165090 A1 | 8/2004 | Ning | |
| 2004/0184041 A1 | 9/2004 | Schopp | |
| 2004/0211836 A1 | 10/2004 | Patel et al. | |
| 2004/0214623 A1 | 10/2004 | Takahashi et al. | |
| 2004/0233461 A1 | 11/2004 | Armstrong et al. | |
| 2004/0258353 A1 | 12/2004 | Gluckstad et al. | |
| 2005/0006477 A1 | 1/2005 | Patel | |
| 2005/0117215 A1 | 6/2005 | Lange | |
| 2005/0128196 A1 | 6/2005 | Popescu et al. | |
| 2005/0168488 A1 | 8/2005 | Montague | |
| 2005/0211782 A1 | 9/2005 | Martin | |
| 2005/0264867 A1 | 12/2005 | Cho et al. | |
| 2006/0047704 A1 | 3/2006 | Gopalakrishnan | |
| 2006/0078226 A1 | 4/2006 | Zhou | |
| 2006/0108266 A1* | 5/2006 | Bowers | B07C 3/00 209/584 |
| 2006/0112023 A1 | 5/2006 | Horhann | |
| 2006/0151604 A1 | 7/2006 | Zhu et al. | |
| 2006/0159307 A1 | 7/2006 | Anderson et al. | |
| 2006/0159344 A1 | 7/2006 | Shao et al. | |
| 2006/0213999 A1 | 9/2006 | Wang et al. | |
| 2006/0232681 A1 | 10/2006 | Okada | |
| 2006/0255150 A1 | 11/2006 | Longacre | |
| 2006/0269165 A1 | 11/2006 | Viswanathan | |
| 2006/0291719 A1 | 12/2006 | Ikeda et al. | |
| 2007/0003154 A1 | 1/2007 | Sun et al. | |
| 2007/0025612 A1 | 2/2007 | Iwasaki et al. | |
| 2007/0031064 A1 | 2/2007 | Zhao et al. | |
| 2007/0063048 A1 | 3/2007 | Havens et al. | |
| 2007/0116357 A1 | 5/2007 | Dewaele | |
| 2007/0127022 A1 | 6/2007 | Cohen et al. | |
| 2007/0143082 A1 | 6/2007 | Degnan | |
| 2007/0153293 A1 | 7/2007 | Gruhlke et al. | |
| 2007/0171220 A1 | 7/2007 | Kriveshko | |
| 2007/0177011 A1 | 8/2007 | Lewin et al. | |
| 2007/0181685 A1 | 8/2007 | Zhu et al. | |
| 2007/0237356 A1 | 10/2007 | Dwinell et al. | |
| 2007/0291031 A1 | 12/2007 | Konev et al. | |
| 2007/0299338 A1 | 12/2007 | Stevick et al. | |
| 2008/0013793 A1 | 1/2008 | Hillis et al. | |
| 2008/0035390 A1 | 2/2008 | Wurz | |
| 2008/0056536 A1 | 3/2008 | Hildreth et al. | |
| 2008/0062164 A1 | 3/2008 | Bassi et al. | |
| 2008/0077265 A1 | 3/2008 | Boyden | |
| 2008/0164074 A1 | 7/2008 | Wurz | |
| 2008/0204476 A1 | 8/2008 | Montague | |
| 2008/0212168 A1 | 9/2008 | Olmstead et al. | |
| 2008/0247635 A1 | 10/2008 | Davis et al. | |
| 2008/0273191 A1 | 11/2008 | Kim et al. | |
| 2008/0273210 A1 | 11/2008 | Hilde | |
| 2008/0278790 A1 | 11/2008 | Boesser et al. | |
| 2009/0059004 A1 | 3/2009 | Bochicchio | |
| 2009/0081008 A1 | 3/2009 | Somin et al. | |
| 2009/0095047 A1 | 4/2009 | Patel et al. | |
| 2009/0134221 A1 | 5/2009 | Zhu et al. | |
| 2009/0195790 A1 | 8/2009 | Zhu et al. | |
| 2009/0225333 A1 | 9/2009 | Bendall et al. | |
| 2009/0237411 A1 | 9/2009 | Gossweiler et al. | |
| 2009/0268023 A1 | 10/2009 | Hsieh | |
| 2009/0272724 A1 | 11/2009 | Gubler | |
| 2009/0273770 A1 | 11/2009 | Bauhahn et al. | |
| 2009/0313948 A1 | 12/2009 | Buckley et al. | |
| 2009/0318815 A1 | 12/2009 | Barnes et al. | |
| 2009/0323084 A1 | 12/2009 | Dunn et al. | |
| 2009/0323121 A1 | 12/2009 | Valkenburg | |
| 2010/0035637 A1 | 2/2010 | Varanasi et al. | |
| 2010/0060604 A1 | 3/2010 | Zwart et al. | |
| 2010/0091104 A1 | 4/2010 | Sprigle | |
| 2010/0118200 A1 | 5/2010 | Gelman et al. | |
| 2010/0128109 A1 | 5/2010 | Banks | |
| 2010/0161170 A1 | 6/2010 | Siris | |
| 2010/0171740 A1 | 7/2010 | Andersen et al. | |
| 2010/0172567 A1 | 7/2010 | Prokoski | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0202702 A1 | 8/2010 | Benos et al. | |
| 2010/0208039 A1 | 8/2010 | Stettner | |
| 2010/0211355 A1 | 8/2010 | Horst et al. | |
| 2010/0217678 A1 | 8/2010 | Goncalves | |
| 2010/0220849 A1 | 9/2010 | Colbert et al. | |
| 2010/0220894 A1 | 9/2010 | Ackley et al. | |
| 2010/0223276 A1 | 9/2010 | Al-Shameri et al. | |
| 2010/0245850 A1 | 9/2010 | Lee et al. | |
| 2010/0254611 A1 | 10/2010 | Arnz | |
| 2010/0303336 A1 | 12/2010 | Abraham | |
| 2010/0315413 A1 | 12/2010 | Izadi et al. | |
| 2010/0321482 A1 | 12/2010 | Cleveland | |
| 2011/0019155 A1 | 1/2011 | Daniel et al. | |

(56) References Cited

U.S. PATENT DOCUMENTS

| | | |
|---|---|---|
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0342342 A1 | 12/2013 | Sabre et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1* | 2/2014 | Laffargue ............ G01F 25/0084 348/135 |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0091147 A1 | 4/2014 | Evans et al. |
| 2014/0097238 A1 | 4/2014 | Ghazizadeh |
| 2014/0098091 A1 | 4/2014 | Hori |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |

(56) References Cited

U.S. PATENT DOCUMENTS

| | | |
|---|---|---|
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Hirata et al. |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0333775 A1 | 11/2014 | Naikal et al. |
| 2014/0344943 A1 | 11/2014 | Todeschini et al. |
| 2014/0346233 A1 | 11/2014 | Liu et al. |
| 2014/0347553 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204662 A1 | 7/2015 | Kobayashi et al. |
| 2015/0204671 A1 | 7/2015 | Showering |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0301181 A1 | 10/2015 | Herschbach |
| 2015/0308816 A1 | 10/2015 | Laffargue et al. |
| 2015/0325036 A1 | 11/2015 | Lee |
| 2015/0355470 A1 | 12/2015 | Herschbach |
| 2016/0040982 A1 | 2/2016 | Li et al. |
| 2016/0048725 A1 | 2/2016 | Holz et al. |
| 2016/0063429 A1 | 3/2016 | Varley et al. |
| 2016/0088287 A1 | 3/2016 | Sadi et al. |

(56) References Cited

U.S. PATENT DOCUMENTS

| | | |
|---|---|---|
| 2016/0090283 A1 | 3/2016 | Svensson et al. |
| 2016/0090284 A1 | 3/2016 | Svensson et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0343176 A1 | 11/2016 | Ackley |
| 2017/0115490 A1 | 4/2017 | Hsieh et al. |
| 2017/0182942 A1 | 6/2017 | Hardy et al. |

FOREIGN PATENT DOCUMENTS

| | | | |
|---|---|---|---|
| DE | 10210813 A1 | 10/2003 | |
| DE | 102007037282 A1 | 3/2008 | |
| EP | 1111435 A2 | 6/2001 | |
| EP | 1443312 A1 | 8/2004 | |
| EP | 2286932 A2 | 2/2011 | |
| EP | 2381421 A2 | 10/2011 | |
| EP | 2533009 A1 | 12/2012 | |
| EP | 2722656 A1 | 4/2014 | |
| EP | 2779027 A1 | 9/2014 | |
| EP | 2833323 A2 | 2/2015 | |
| EP | 2843590 A2 | 3/2015 | |
| EP | 2845170 A1 | 3/2015 | |
| EP | 2966595 A1 | 1/2016 | |
| EP | 3006893 A1 | 3/2016 | |
| EP | 3012601 A1 | 3/2016 | |
| EP | 3007096 A1 | 4/2016 | |
| GB | 2503978 A1 | 1/2014 | |
| GB | 2525053 A | 10/2015 | |
| GB | 2531928 A | 5/2016 | |
| JP | H04129902 A | 4/1992 | |
| JP | 200696457 A | 4/2006 | |
| JP | 2007084162 A | 4/2007 | |
| JP | 2008210276 A | 9/2008 | |
| JP | 2014210646 A | 11/2014 | |
| JP | 2015174705 A | 10/2015 | |
| KR | 20110013200 A | 2/2011 | |
| KR | 20110117020 A | 10/2011 | |
| KR | 20120028109 A | 3/2012 | |
| WO | 96/40452 A1 | 12/1996 | |
| WO | 0077726 A1 | 12/2000 | |
| WO | 0114836 A1 | 3/2001 | |
| WO | 2006095110 A1 | 9/2006 | |
| WO | 2007015059 A1 | 2/2007 | |
| WO | 2011017241 A1 | 2/2011 | |
| WO | 2012175731 A1 | 12/2012 | |
| WO | 2013021157 A1 | 2/2013 | |
| WO | 2013033442 A1 | 3/2013 | |
| WO | 2013163789 A1 | 11/2013 | |
| WO | 2013166368 A1 | 11/2013 | |
| WO | 2013173985 A1 | 11/2013 | |
| WO | 2013184340 A1 | 12/2013 | |
| WO | 2014019130 A1 | 2/2014 | |
| WO | 2014023697 A1 | 2/2014 | |
| WO | 2014102341 A1 | 7/2014 | |
| WO | 2014110495 A1 | 7/2014 | |
| WO | 2014149702 A1 | 9/2014 | |
| WO | 2014151746 A1 | 9/2014 | |
| WO | 2015006865 A1 | 1/2015 | |
| WO | 2016020038 A1 | 2/2016 | |
| WO | 2016061699 A1 | 4/2016 | |

OTHER PUBLICATIONS

Lloyd et al., "System for Monitoring the Condition of Packages Throughout Transit", U.S. Appl. No. 14/865,575, filed Sep. 25, 2015, 59 pages, not yet published.

McCloskey et al., "Image Transformation for Indicia Reading," U.S. Appl. No. 14/928,032, filed Oct. 30, 2015, 48 pages, not yet published.

Great Britain Combined Search and Examination Report in related Application GB1517842.9, dated Apr. 8, 2016, 8 pages.

Search Report in counterpart European Application No. 15182675.7, dated Dec. 4, 2015, 10 pages.

Wikipedia, "3D projection" Downloaded on Nov. 25, 2015 from www.wikipedia.com, 4 pages.

M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.

European Extended Search Report in Related EP Application No. 16172995.9, dated Aug. 22, 2016, 11 pages.

European Extended search report in related EP Application No. 15190306.9, dated Sep. 9, 2016, 15 pages.

Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.

European extended Search report in related EP Application 13785171.3, dated Sep. 19, 2016, 8 pages.

El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.

El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.

H. Sprague Ackley, "Automatic Mode Switching in a Volume Dimensioner", U.S. Appl. No. 15/182,636, filed Jun. 15, 2016, 53 pages, Not yet published.

Bosch Tool Corporation, "Operating/Safety Instruction for DLR 130", Dated Feb. 2, 2009, 36 pages.

European Search Report for related EP Application No. 16152477.2, dated May 24, 2016, 8 pages.

Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].

Houle et al., "Vehical Positioning and Object Avoidance", U.S. Appl. No. 15/007,522 [not yet published], filed Jan. 27, 2016, 59 pages.

United Kingdom combined Search and Examination Report in related GB Application No. 1607394.2, dated Oct. 19, 2016, 7 pages.

European Search Report from related EP Application No. 16168216.6, dated Oct. 20, 2016, 8 pages.

Peter Clarke, Actuator Developer Claims Anti-Shake Breakthrough for Smartphone Cams, Electronic Engineering Times, p. 24, May 16, 2011.

Spiller, Jonathan; Object Localization Using Deformable Templates, Master's Dissertation, University of the Witwatersrand, Johannesburg, South Africa, 2007; 74 pages.

Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.

European Search Report for application No. EP13186043 dated Feb. 26, 2014 (now EP2722656 (Apr. 23, 2014)): Total pp. 7.

International Search Report for PCT/US2013/039438 (WO2013166368), dated Oct. 1, 2013, 7 pages.

(56) References Cited

OTHER PUBLICATIONS

Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
European Office Action for application EP 13186043, dated Jun. 12, 2014(now EP2722656 (Apr. 23, 2014)), Total of 6 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
U.S. Appl. No. 14/801,023, Tyler Doomenbal et al., filed Jul. 16, 2015, not published yet, Adjusting Dimensioning Results Using Augmented Reality, 39 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Second Chinese Office Action in related CN Application No. 201520810685.6, dated Mar. 22, 2016, 5 pages, no references.
European Search Report in related EP Application No. 15190315.0, dated Apr. 1, 2016, 7 pages.
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
U.S. Appl. No. 14/800,757, Eric Todeschini, filed Jul. 16, 2015, not published yet, Dimensioning and Imaging Items, 80 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
Search Report and Opinion in related GB Application No. 1517112.7, dated Feb. 19, 2016, 6 Pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application on. GB1517843.7, dated Feb. 23, 2016; 8 pages.
Padzensky, Ron; "Augmera; Gesture Control", Dated Apr. 18, 2015, 15 pages.
Grabowski, Ralph; "New Commands in AutoCADS 2010: Part 11 Smoothing 3D Mesh Objects" Dated 2011, 6 pages.
Theodoropoulos, Gabriel; "Using Gesture Recognizers to Handle Pinch, Rotate, Pan, Swipe, and Tap Gestures" dated Aug. 25, 2014, 34 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.

(56) References Cited

OTHER PUBLICATIONS

Wikipedia, "Microlens", Downloaded from https://en.wikipedia.org/wiki/Microlens, pp. 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages. [References have been previously cited].
European extended search report in related EP Application 16190833.0, dated Mar. 9, 2017, 8 pages. [only new art has been cited; US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
Eksma Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages. [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et. al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.

(56) References Cited

OTHER PUBLICATIONS

U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed on Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Sian et al.); 22 pages.
U.S. Appl. No. 14/405,278 for Design Pattern for Secure Store filed Mar. 9, 2015 (Zhu et. al.) 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
Ralph Grabowski, "Smothing 3D Mesh Objects," New Commands in AutoCAD 2010: Part 11, Examiner Cited art in related matter Non Final Office Action dated May 19, 2017; 6 pages.
European Exam Report in related EP Application No. 15176943.7, dated Apr. 12, 2017, 6 pages.
European Exam Report in related EP Application No. 15188440.0, dated Apr. 21, 2017, 4 pages.
European Exam Report in related EP Application No. 16152477.2, dated Jun. 20, 2017, 4 pages [No art to be cited].
European Exam Report in related EP Application 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].

\* cited by examiner

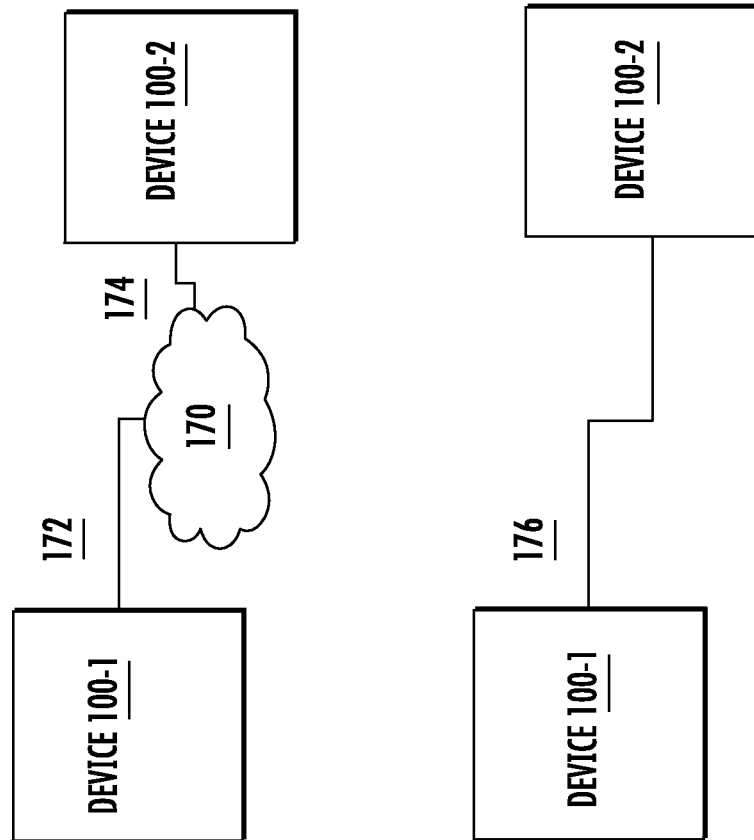

MOBILE DIMENSIONER APPARATUS FOR USE IN COMMERCE

FIELD OF THE INVENTION

The present invention relates to volume dimensioning devices.

BACKGROUND

Volume dimensioning devices, i.e. dimensioners, are devices that are used for estimating sizes of items (such as boxes) and the sizes of empty spaces (such as the volume left in a delivery truck). Dimensioners may be larger devices that are a static part of a larger logistical system in a distribution center or warehouse, or they may be smaller mobile devices designed for portable use. Mobile dimensioners that are certified for use in commerce can be used to charge customers for shipment based on the dimensions of an item. The National Conference on Weights and Measures (NCWM) issues a National Type Evaluation Program (NTEP) Certificate of Conformance to mobile dimensioners that have been evaluated and found to produce accurate measurements capable of meeting applicable requirements of the National Institute of Standards and Technology (NIST) Handbook 44, entitled "Specifications, Tolerances, and Other Technical Requirements for Weighing and Measuring Devices."

Despite the certification process, mobile dimensioners can have variable tolerances in measurements as a result of the inherent variations that arise from different methods of measurement. The same item could be measured from two different locations, resulting in two different methods of measurement, each with a different angle relative to the item being measured as well as a different distance to the item being measured. Consequently, it is possible to have two different measurements for an item, both of which are certifiable and correct, all because of the variable tolerances in the methods of measurement. More specifically, because the accuracy dimension (referred to as "d" in the NIST and NTEP documentation) can change, two different yet valid measurements can be obtained simply by moving the mobile dimensioner around.

By way of a non-limiting example, assume that one dimension of an item to be shipped has been measured with a mobile dimensioner to be 9.5 with an accuracy dimension of 0.5 (i.e. d=0.5). Simply moving the mobile dimensioner side to side or further away might provide the same dimension with a measurement of 10 with an accuracy dimension of 1.0 (i.e. d=1.0). In yet other situations, it is possible to produce variable measurements for the same dimension with the same accuracy dimension. Again, simply by moving the mobile dimensioner in and out, it would be possible to go from a measurement of 10 with a d=1.0 to a measurement of 9 with a d=1.0.

One of the primary reasons behind government oversight of the measurement process is to ensure that vendors are not employing improper measurements in their business transactions with both customers and shipping companies. Since a mobile dimensioner has the inherent ability to produce different certifiable measurements, a disreputable vendor, could in practice, move the device back and forth within the useable range, for example closer and father away, always looking at the reported dimension and then picking the larger dimension for overcharging customers and the smaller dimension for cheating shippers. Therefore, over time, a disreputable vendor can employ a certified mobile dimensioner to determine a method of measurement designed to systematically defraud customers and shippers.

Therefore, a need exists for a mobile dimensioner designed to thwart activities intended to generate fraudulent measurements.

SUMMARY

Accordingly one aspect of the present invention discloses a mobile dimensioner device, comprising: a display; one or more optical sensors; one or more measurement sensors; an input subsystem; a clock system; one or more processors; and memory containing instructions executable by the one or more processors whereby the device is operable to: receive a threshold time period; activate at least one of the one or more measurement sensors; derive a first set of dimensions for an object and an associated indication of the dimensional accuracy of each of the dimensions based on information received from the one or more measurement sensors; display, on the display, the first set of dimensions and the associated indication of the dimensional accuracy of each of the dimensions; determine the time interval since the first set of dimensions for the object was derived; if the time interval exceeds the threshold time period, receive a deactivation event.

In other exemplary embodiments, the threshold time period is defined by one of the group consisting of: defined by the manufacturer of the device, defined to comply with certification standards set by a certification organization, defined in response to input received via the input subsystem at the device, and defined in response to information received at the device from a server.

In additional exemplary embodiments, the deactivation event is selected from the group consisting of: a power off event for the device, an event that turns off the ability of the device to take measurements, an event that turns off the one or more measurement sensors of the device, an event that restricts the ability of the device to report results, an event that turns off one or more communication interfaces of the device, an event that deactivates the measurement sensors and displays the first set of dimensions, an event that deactivates the measurement sensors and places the device in a state requiring reset, and an event that deactivates the measurement sensors and deletes the first set of dimensions.

In further embodiments, the one or more optical sensors are selected from a group consisting of: a barcode sensor, a camera, and an image sensor.

In yet other embodiments, the one or more measurement sensors are selected from a group consisting of: point-cloud projection, structured light, and stereoscopic cameras and n-scopic cameras.

Another aspect of the present invention discloses a mobile dimensioner device, comprising: a display; one or more optical sensors; one or more measurement sensors; an input subsystem; one or more processors; and memory containing instructions executable by the one or more processors whereby the device is operable to: receive a threshold number of contrary events; activate at least one of the one or more measurement sensors; derive a first set of dimensions for an object and an associated indication of the dimensional accuracy of each of the dimensions based on information received from the one or more measurement sensors; display, on the display, the first set of dimensions and the associated indication of the dimensional accuracy of each of the dimensions; display, on the display, an indication to obtain a better measurement of the object; detect a number of contrary events; if the number of contrary events detected exceeds the threshold number of contrary events, receive a deactivation event.

In still other exemplary embodiments, the device is further operable to: derive a set of preliminary dimensions for an object based on information received from the one or more measurement sensors.

In more embodiments, the contrary event is an action that does not correspond to an indication to obtain a better measurement of the object.

In some embodiments, the threshold number of contrary events is defined by one of the group consisting of: defined by the manufacturer of the device, defined to comply with certification standards set by a certification organization, defined in response to input received via the input subsystem at the device, and defined in response to information received at the device from a server.

An additional aspect of the present invention discloses a mobile dimensioner device, comprising: a display; one or more optical sensors; one or more measurement sensors; an input subsystem; one or more processors; and memory containing instructions executable by the one or more processors whereby the device is operable to: activate at least one of the one or more measurement sensors; derive a set of first dimensions for an object and an associated indication of the first dimensional accuracy of each of the first dimensions based on information received from the one or more measurement sensors; display, on the display, the set of first dimensions and the associated indication of the first dimensional accuracy of each of the first dimensions; derive a set of second dimensions for an object and an associated indication of the second dimensional accuracy of each of the second dimensions based on information received from the one or more measurement sensors; display, on the display, the set of second dimensions and the associated indication of the first dimensional accuracy of each of the first dimensions; in response to an input to capture the set of second dimensions, determine if the second dimensional accuracy is greater than the first dimensional accuracy; if the second dimensional accuracy is greater than the first dimensional accuracy; then receive a deactivation event; and if the second dimensional accuracy is not greater than the first dimensional accuracy; then capture the second set of dimensions.

In yet other embodiments, the device further comprises: a communication interface.

In still more embodiments, the communication interface is selected from the group consisting of: Bluetooth, Ethernet, wireless Ethernet, USB, serial, and $I^2C$.

In other embodiments, the device is further operable to: send the second set of dimensions to a server.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1B and FIG. 1C are block diagrams of the hardware elements of the system in accordance with embodiments of the disclosed subject matter.

DETAILED DESCRIPTION

The present invention embraces the concept of restricting a mobile dimensioner from reporting systematically either the highest or lowest dimensions. Because the measurement results from a mobile dimensioner are not predictable, e.g. a mobile dimensioner used at its farthest range will not necessarily produce larger or smaller dimensions, a disreputable vendor must move the mobile dimensioner in and out and/or right or left looking for a specific measurement conducive to defrauding customers and shippers. This behavior must be repeated with each measurement because each item being measured will have a different size and will produce different results. In embodiments of the present invention, a mobile dimensioner device detects excessive measuring time and/or a repetitive range of motion and deactivates upon detection of this inappropriate behavior. In other embodiments of the present invention, a mobile dimensioner device detects when a measurement with a greater accuracy has been taken (i.e. a small accuracy dimension "d" value) and restricts the dimensioner from reporting measurements with less accuracy (i.e. a large accuracy dimension "d" value).

Figure 1A:
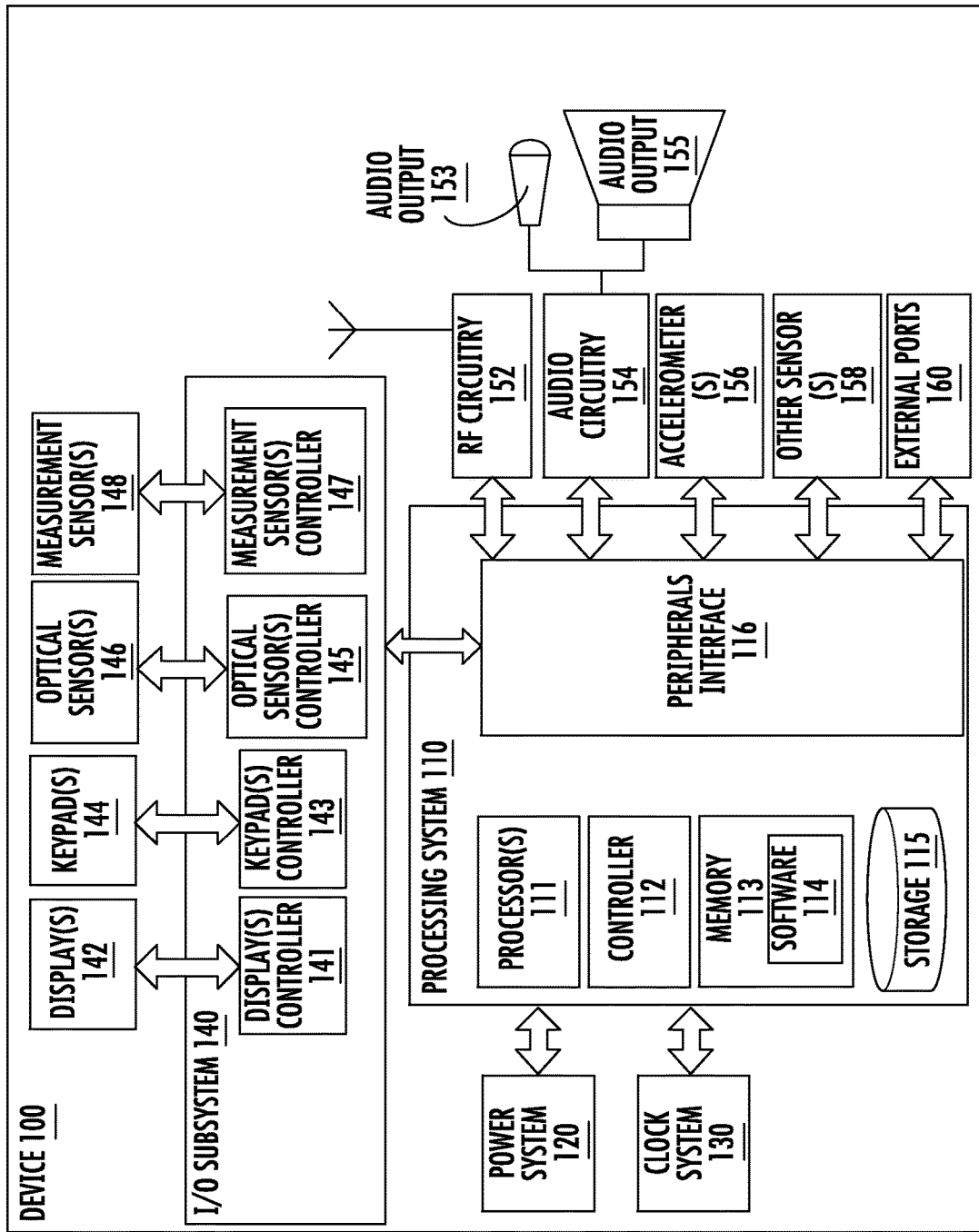
FIG. 1A is a block diagram of the hardware elements of a device according to embodiments of the disclosed subject matter.

FIG. 1A illustrates an exemplary device 100, such as a mobile dimensioner device, for one embodiment of the present invention. The device 100 may include other components not shown in FIG. 1A, nor further discussed herein for the sake of brevity. One having ordinary skill in the art will understand the additional hardware and software included but not shown in FIG. 1A.

In general, device 100 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, volume dimensioning devices, mobile dimensioners, and other similar computing devices.

In some embodiments of the present invention, the device 100 of FIG. 1A can be connected to other devices, designated 100-X. In one embodiment, device 100-1 may be connected to another device 100-2 via a network 170, as shown in FIG. 1B. The network 170 may be any type of wide area network (WAN), such as the Internet, Local Area Network (LAN), or the like, or any combination thereof, and may include wired components, such as Ethernet, wireless components, such as LTE, Wi-Fi, Bluetooth, or near field communication (NFC), or both wired and wireless components, collectively represented by the data links 172 and 174.

In other embodiments of the present invention, the device 100-1 may be connected to another device 100-2 via a wired communication channel 176, as shown in FIG. 1C. The wired communication channel 176 may be Universal Serial Bus (USB), serial, Inter-Integrated Circuit (I²C), or other computer bus.

In one embodiment, the device 100-1 is a mobile dimensioner device and the device 100-2 is a server than handles backend functions like invoicing customers for the packages being shipped. In this embodiment, FIG. 1B and FIG. 1C represent ways that the devices can be connected to allow the measurement information from device 100-1 to be shared with the backend system of device 100-2.

In general, as shown, the device 100 of FIG. 1A includes a processing system 110 that includes one or more processors 111, such as Central Processing Units (CPUs), Application Specific Integrated Circuits (ASICs), and/or Field Programmable Gate Arrays (FPGAs), a memory controller 112, memory 113, which may include software 114, and other components that are not shown for brevity, such as busses, etc. The processing system may also include storage 115, such as a hard drive or solid state drive.

The processing system 110 also includes a peripherals interface 116 for communicating with other components of the device 100, including but not limited to, radio frequency (RF) circuitry 152, such as Wi-Fi and/or cellular communications circuitry such as wireless Ethernet, Bluetooth, and near field communication (NFC), audio circuitry 154 for the audio input component 153, such as a microphone, and audio output component 155, such as a speaker, one or more accelerometers 156, one or more other sensors 158, such as a location determination component such as a Global Positioning System (GPS) chip, and one or more external ports 160, which may be used for smart card readers or for wired connections such as wired Ethernet, USB, serial or I²C ports. The RF circuitry 152 and external ports 160 individually and collectively make up the communication interfaces for the device 100. The processing system 110 is also connected to a power system component 120 that is used to power the device 100, such as a battery or a power supply unit. The processing system 110 is also connected to a clock system component 130 that controls a timer for use by the disclosed embodiments.

The peripherals interface 116 may also communicate with an Input/Output (I/O) subsystem 140, which includes a display(s) controller 141 operative to control display(s) 142. In some embodiments the display(s) 142 is a touch-sensitive display system, and the display(s) controller 141 is further operative to process touch inputs on the touch sensitive display 142. The I/O subsystem 140 may also include a keypad(s) controller 143 operative to control keypad(s) 144 on the device 100. The I/O subsystem 140 also includes an optical sensor(s) controller 145 operative to control one or more optical sensor(s) 146. The optical sensor(s) may include, but is not limited to, a barcode sensor, a camera, and an image sensor. The I/O subsystem 140 also includes a measurement sensor(s) controller 147 operative to control one or more measurement sensor(s) 148. The measurement sensor(s) may include, but is not limited to, a point-cloud projection sensor, a structured light sensor, a stereoscopic camera, and an n-scopic camera. The components of device 100 may be interconnected using one or more buses, represented generically by the arrows of FIG. 1A, and may be mounted on a motherboard (not shown) or some other appropriate configuration.

Figure 2:
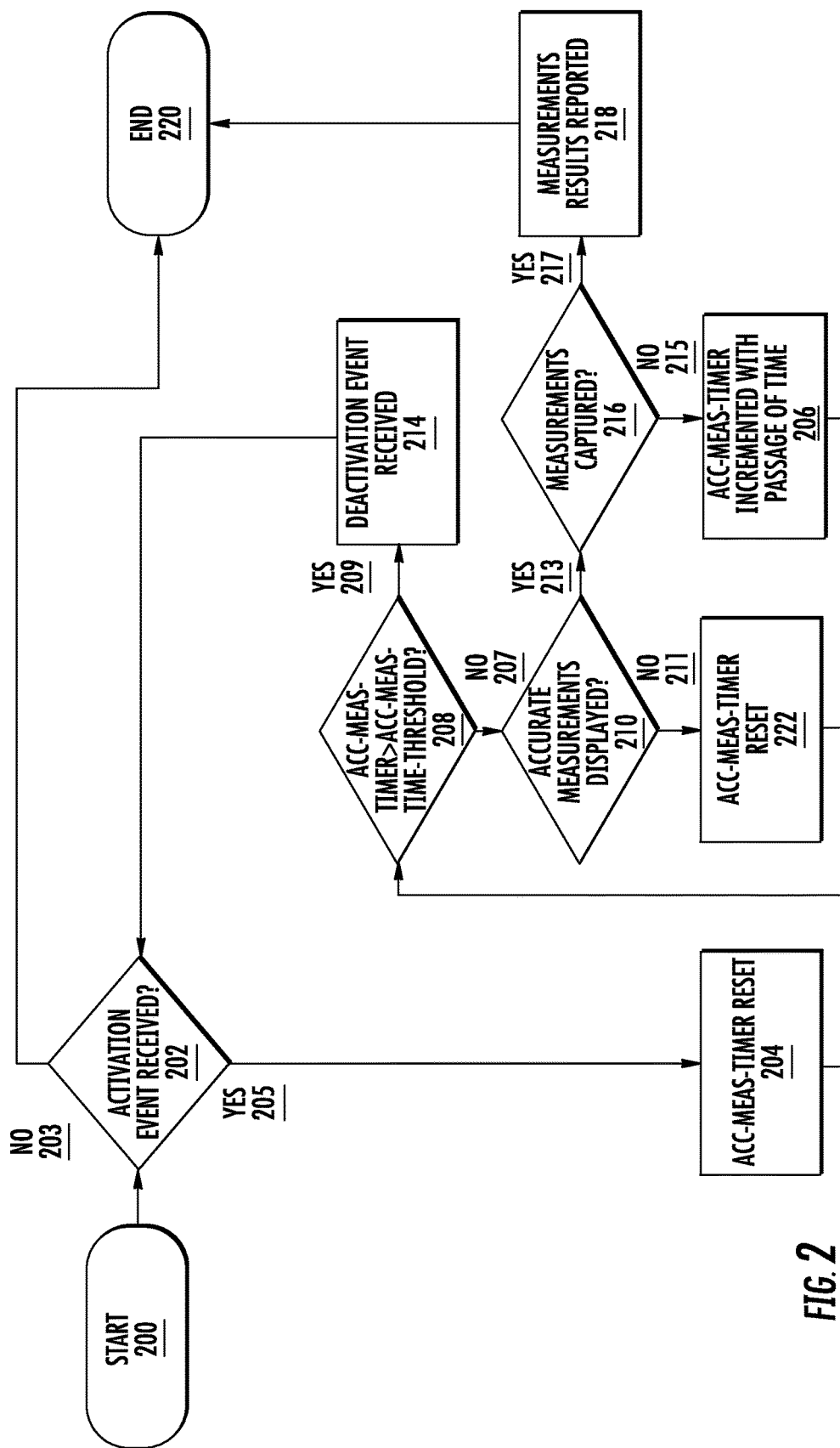
FIG. 2 is a flow chart outlining the process for deactivating a device in accordance with embodiments of the disclosed subject matter in response to the detection of excessive measuring time.

FIG. 2 is a flow chart outlining the process for deactivating a device in accordance with embodiments of the disclosed subject matter in response to the detection of excessive measuring time. The process begins at Step 200 followed by Step 202 in which a check is made to see if an activation event has been received by the mobile dimensioner device 100. If not (Path 203), then the process ends (Step 220). If an activation event has been received (Path 205), then the process continues.

In some embodiments, the activation event comprises a power on event or a power cycling event for the mobile dimensioner device 100. In other embodiments, the activation event comprises an event that turns on the ability of the mobile dimensioner device 100 to take measurements, such as turning on one or more measurement sensors 148. In other embodiments, the activation event comprises an event that turns on the communication interfaces 160 and/or 152 of mobile dimensioner device 100-1 to report measurement results to the server 100-2. In still other embodiments, an activation event may also comprise a reset of any existing measurements currently in memory 113 or storage 115 of the mobile dimensioner device 100, or a reset of the mobile dimensioner device itself. In additional embodiments, the activation event includes a preliminary scan of the object to derive some preliminary dimensions. Note that in some embodiments, the object can be empty space, e.g. the amount of dirt removed from a hole or the amount of space remaining in a delivery truck. However, in other embodiments, the object will be a package that is being shipped.

Next, the mobile dimensioner device 100 then resets a timer used in the detection of excessive measuring time. This timer is called the acc-meas-timer in FIG. 2 (step 204) as it is used to track the amount of time that transpires from when an accurate measurement is obtained to when the measurement is captured. In some embodiments, the mobile dimensioner device 100 records an infra-red (IR) image of a pattern of light projected on an object being measured. The mobile dimensioner device, though hardware and software, transform the image into three dimensional data about the object. That three dimensional data is used to derive an accurate measurement for the object.

The mobile dimensioner device 100 then checks to see if the acc-meas-timer is greater than a specified threshold (Step 208). This threshold is called the acc-meas-time-threshold in FIG. 2. The acc-meas-time-threshold may be set by the manufacturer of the mobile dimensioner device 100, may be set to comply with certification standards set by a certification organization, may be set by a server 100-2, may be set in response to an input at the mobile dimensioner device 100, or may be set in some other manner.

If the acc-meas-timer is less than or equal to the acc-meas-time-threshold (Path 207), i.e. the amount of time spent between obtaining and capturing an accurate measurement is not excessive, then the mobile dimensioner device 100 checks to see if an accurate measurement has been obtained and displayed (Step 210). If no accurate measurement has been obtained and displayed (Path 211), then the mobile dimensioner device 100 resets the acc-meas-timer (Step 222), and the process then continues to Step 208 as described above.

Returning to Step 210, if an accurate measurement has been obtained and displayed (Path 213), then the mobile dimensioner device checks to see if the measurement has been captured (Step 216). In some embodiments, the measurement may be captured in response to an input at the mobile dimensioner device 100, or may be set in some other manner. If the measurement is captured (Path 217), then the measurement results are reported (Step 218) and the process is complete (Step 220). If the measurement is not captured (Path 215), then the clock system 130 of the mobile dimensioner device 100 increments the acc-meas-timer with the passage of time (Step 206) and the process continues to Step 208 as described above.

Returning to Step 208, if the acc-meas-timer is greater than the acc-meas-time-threshold (Path 209), i.e. the amount of time spent in obtaining and capturing an accurate measurement is excessive, then the process continues to Step 214 where a deactivation event is received by the mobile dimensioner device 100, and the mobile dimensioner device returns to a state where it waits for an activation event (Step 202). In some embodiments, the deactivation event comprises a power off event for the mobile dimensioner device 100 itself. In alternative embodiments, the deactivation event comprises placing the device in a state requiring a reset, such as a key sequence to reset or a simple power cycle reset. In other embodiments, the deactivation event comprises an event that turns off the ability of the mobile dimensioner device 100 to take measurements, such as an event that turns off or temporarily disables one or more measurement sensors 148. In some embodiments, any active measurements in the mobile dimensioner device at the time of the deactivation event may be cleared, i.e. deleted or erased. In other embodiments, any active measurements in the mobile dimensioner device at the time of the deactivation event may be displayed. In yet other embodiments, the deactivation event comprises events restricting the ability of the mobile dimensioner device 100-1 to report the results to the server 100-2, such as events that turn off the communication interfaces 152 and/or 160 of the mobile dimensioner device 100. In some embodiments, the deactivation events are initiated by the mobile dimensioner device 100 itself in response to the criteria met in accordance with FIG. 2 as described above.

In this manner, FIG. 2 describes a use case where, for a mobile dimensioner device 100 that may or may not display an accuracy dimension, once an accurate measurement has been derived and displayed, it must be captured within a certain time period or the mobile dimensioner device 100 will be deactivated.

Figure 3A:
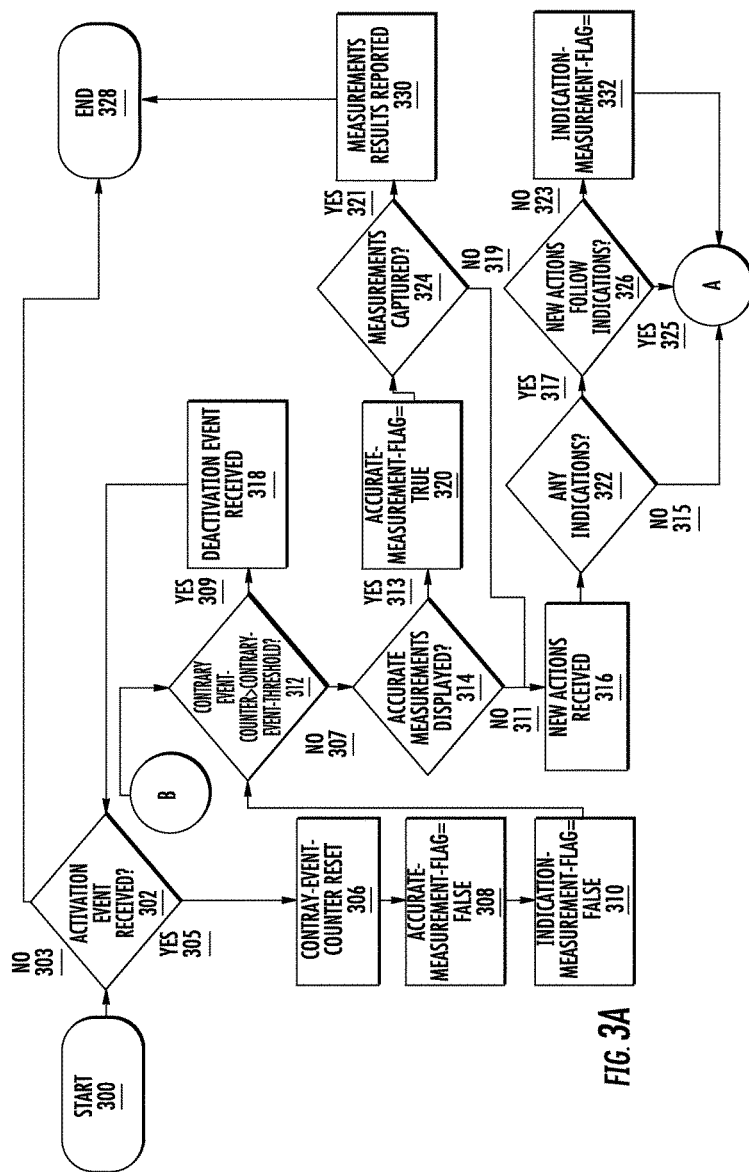
FIG. 3A and FIG. 3B are flow charts outlining the process for deactivating a device in accordance with embodiments of the disclosed subject matter in response to repetitive motion.
Figure 3B:
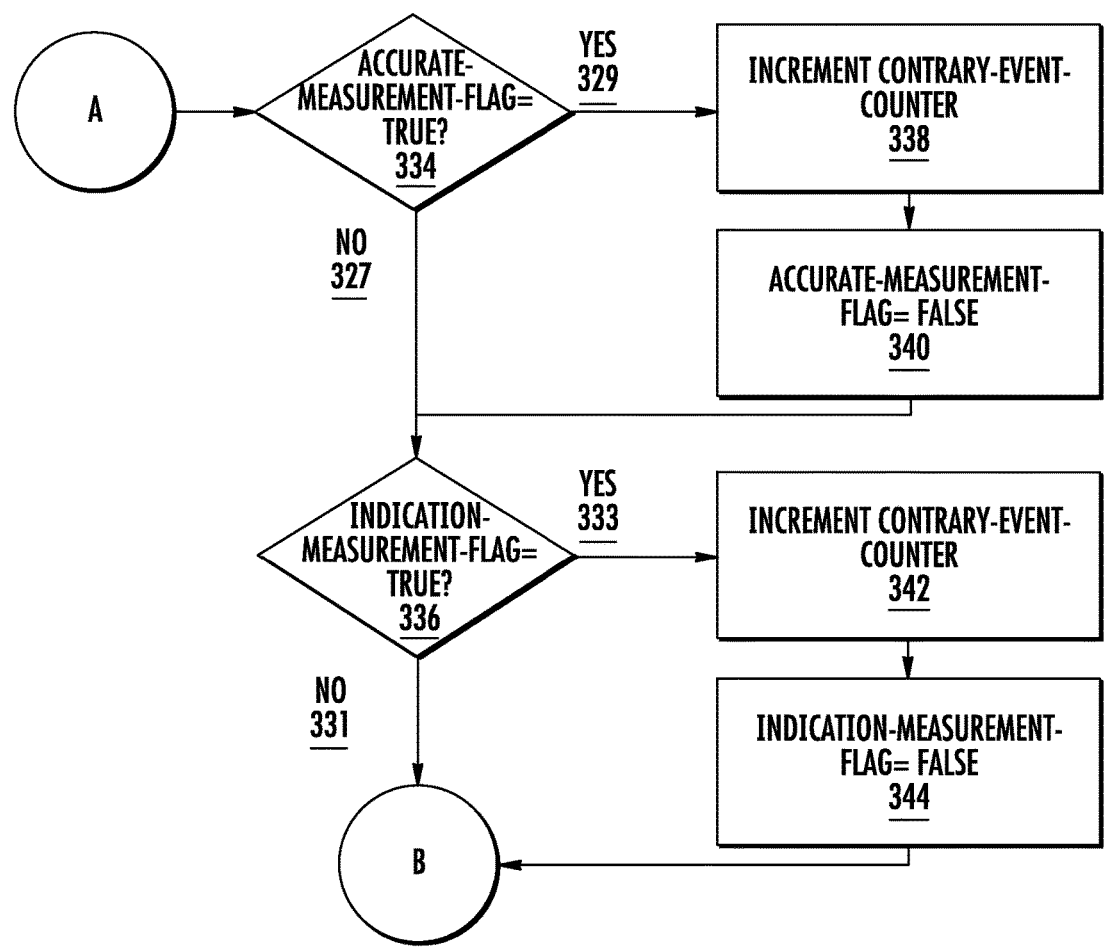

FIG. 3A and FIG. 3B are flow charts outlining the process for deactivating a device in accordance with embodiments of the disclosed subject matter in response to repetitive motion. The process begins in FIG. 3A at Step 300 followed by Step 302 in which a check is made to see if an activation event has been received by the mobile dimensioner device 100. If not (Path 303), then the process ends (Step 328). If an activation event has been received (Path 305), then the process continues.

As described earlier, there are different embodiments for the activation event, including but not limited to: a power on event, a power cycling event, an event that turns on the ability to take measurements, an event that turns on the communication interfaces, an event that resets existing measurements, an event that resets the mobile dimensioner device, and an event that includes a preliminary scan of the object.

Next, the mobile dimensioner device 100 then resets a counter used in the detection of repetitive motion. This counter is called the contrary-event-counter in FIG. 3A (Step 306) as it is used to track the number of times that a contrary event occurs.

A contrary event is an action by the mobile dimensioning device 100 that does not correspond to an indication for a better measurement of the object. As described earlier, an action may be a new measurement taken by the mobile dimensioning device 100, a movement of the mobile dimensioner device 100, or a combination of both.

An indication may either be text or graphics (or both) for a movement that the mobile dimensioner device 100 should take or a measurement that the mobile dimensioner device 100 should obtain (or both a movement and a measurement) in order to better measure the object being measured. By way of a non-limiting example, a movement indication may be a text instruction that provides directions, such as move left, move up, move in closer, etc., that allow the mobile dimensioner device 100 to be moved into a better position for measuring the subject being measured. In another non-limiting example, a movement indication may be an arrow that provides visual cues, such as move down, move right, move back further, etc., that allow the mobile dimensioner device 100 to be moved into a better position for measuring the subject being measured. A measurement indication may include, but is not limited to, a textual instruction, such as "measure the depth of the object", that allows the mobile dimensioner device 100 to obtain a measurement of a particular dimension of the subject being measured. A measurement indication may also include, but is not limited to, a visual representation of the object being measured that highlights particular dimensions of the subject being measured for the mobile dimensioner device 100 to obtain, such as an icon of a box with the depth dimension blinking.

In this respect, a contrary event is more specifically defined as a measurement or movement (or both) by the mobile dimensioning device 100 that does not correspond to a text or graphic (or both) that provides information designed to help the mobile dimensioner device 100 obtain better measurements of the subject being measured. Accordingly, the contrary-event-counter is used to track the number of times that movements or measurements of the mobile dimensioner device 100 are not aligned with the goal of obtaining better measurements for the subject being measured.

In some embodiments, a contrary event also occurs whenever new accurate measurements are derived after an accurate measurement has already been derived but not captured.

Returning to FIG. 3A, the next steps in the process reset flags used to track certain events. The accurate-measurement-flag is a flag that is set to TRUE once an accurate measurement has been obtained by the mobile dimensioner device 100. This flag is initially set to FALSE (Step 308). The indication-measurement-flag is a flag that is set to TRUE if the mobile dimensioner device 100 has any indications for better measurement of the object but the actions of the mobile dimensioner device do not corresponded to those indications. This flag is initially set to FALSE (Step 310).

Next, the mobile dimensioner device 100 checks to see if the contrary-event-counter is greater than a specified threshold (Step 312). This threshold is called the contrary-event-threshold in FIG. 3A. The contrary-event-threshold may be set by the manufacturer of the mobile dimensioner device 100, may be set to comply with certification standards set by a certification organization, may be set by a server 100-2, may be set in response to input at the mobile dimensioner device 100, or may be set in some other manner.

If the contrary-event-counter is less than or equal to the contrary-event-threshold (Path 307), i.e. the number of times that a contrary event has occurred is less than the allowed number, then the mobile dimensioner device 100 checks to see if an accurate measurement has been obtained and displayed (Step 314). If no accurate measurement has been obtained and displayed (Path 311), then the mobile dimensioner device 100 receives new actions (Step 316). In some embodiments, new actions may be new measurements taken by the mobile dimensioner device. In other embodiments, new actions may be movements of the mobile dimensioner device 100, including but not limited to movements in three dimensional space (up-and-down, side-to-side, front-to-back), or a repositioning of the viewing angle of the mobile dimensioner device 100 relative to the object being measured. In other embodiments, new actions include both new measurements and new movements. It should be noted that if the actions do not produce an accurate measurement that can be displayed, then the process set forth in FIG. 3A repeats until such an accurate measurement is derived.

Next, the mobile dimensioner device 100 checks to see if there are any indications for obtaining a better measurement of the object being measured (Step 322). If not (Path 315), then the process continues as indicated by the connector A. If there are indications (Path 317), then the mobile dimensioner device checks to see if the new actions followed or corresponded to the indications (Step 326). If the new actions followed the indications (Path 325), then the process continues as indicated by connector A. If the new actions did not correspond to the indications (Path 323), then the indication-measurement-flag is set to TRUE (Step 332) and the process continues as indicated by connector A.

Returning to Step 314, if an accurate measurement has been obtained and displayed (Path 313), then the accurate-measurement-flag is set to TRUE (Step 320), and then the mobile dimensioner device checks to see if the measurement has been captured (Step 324). As described earlier, in some embodiments, the measurement may be captured in response to input at the mobile dimensioner device 100, or some other manner. If the measurement is captured (Path 321), then the measurement results are reported (Step 330) and the process is complete (Step 328). If the measurement is not captured (Path 319), then process then continues to Step 316 where new actions are received by the mobile dimensioner device 100, as already described.

Connector A from FIG. 3A continues then in FIG. 3B. In this part of the process, the mobile dimensioner device 100 checks the flags and increments the contrary-event counter accordingly. The mobile dimensioner device 100 first checks to see if the accurate-measurement-flag is TRUE. If it is not (Path 327), then the process continues. If it is (Path 329), then the contrary-event counter is incremented (Step 338) and the accurate-measurement-flag is reset to FALSE (Step 340), and the process continues. The mobile dimensioner device 100 then checks to see if the indication-measurement-flag is TRUE (Step 336). If it is not (Path 331), then the process continues as indicated by connector B. If it is (Path 333), then the contrary-event counter is incremented (Step 342) and the indication-measurement-flag is reset to FALSE (Step 344), and the process continues as indicated by connector B.

Connector B from FIG. 3B continues then in FIG. 3A. At this point, the mobile dimensioner device 100 again checks to see if the contrary-event-counter is greater than a specified threshold (Step 312). If the contrary-event-counter is greater than the contrary-event-threshold (Path 309), i.e. the number of times that a contrary event has occurred is now greater than the allowed number, then the mobile dimensioner device 100 then the process continues to Step 318 where a deactivation event is received by the mobile dimensioner device 100, and the mobile dimensioner device returns to a state where it waits for an activation event (Step 302).

As described earlier, there are different embodiments for the deactivation event, including but not limited to: a power off event, an event that turns off the ability to take measurements, an event that turns off sensors, an event that restricts the reporting of results, an event that turns off communication interfaces, an event that deactivates sensors and displays the last set of dimensions, an event that deactivates sensors and requires a device reset, and an event that deactivates and deletes the last set of dimensions.

In this manner, FIGS. 3A and 3B describe a use case where, for a mobile dimensioner device 100 that may or may not display an accuracy dimension, if there are indications for getting a better measurement and they are repeatedly ignored or if an accurate measurement is obtained but is perpetually not captured, then the mobile dimensioner device 100 will be deactivated.

Figure 4A:
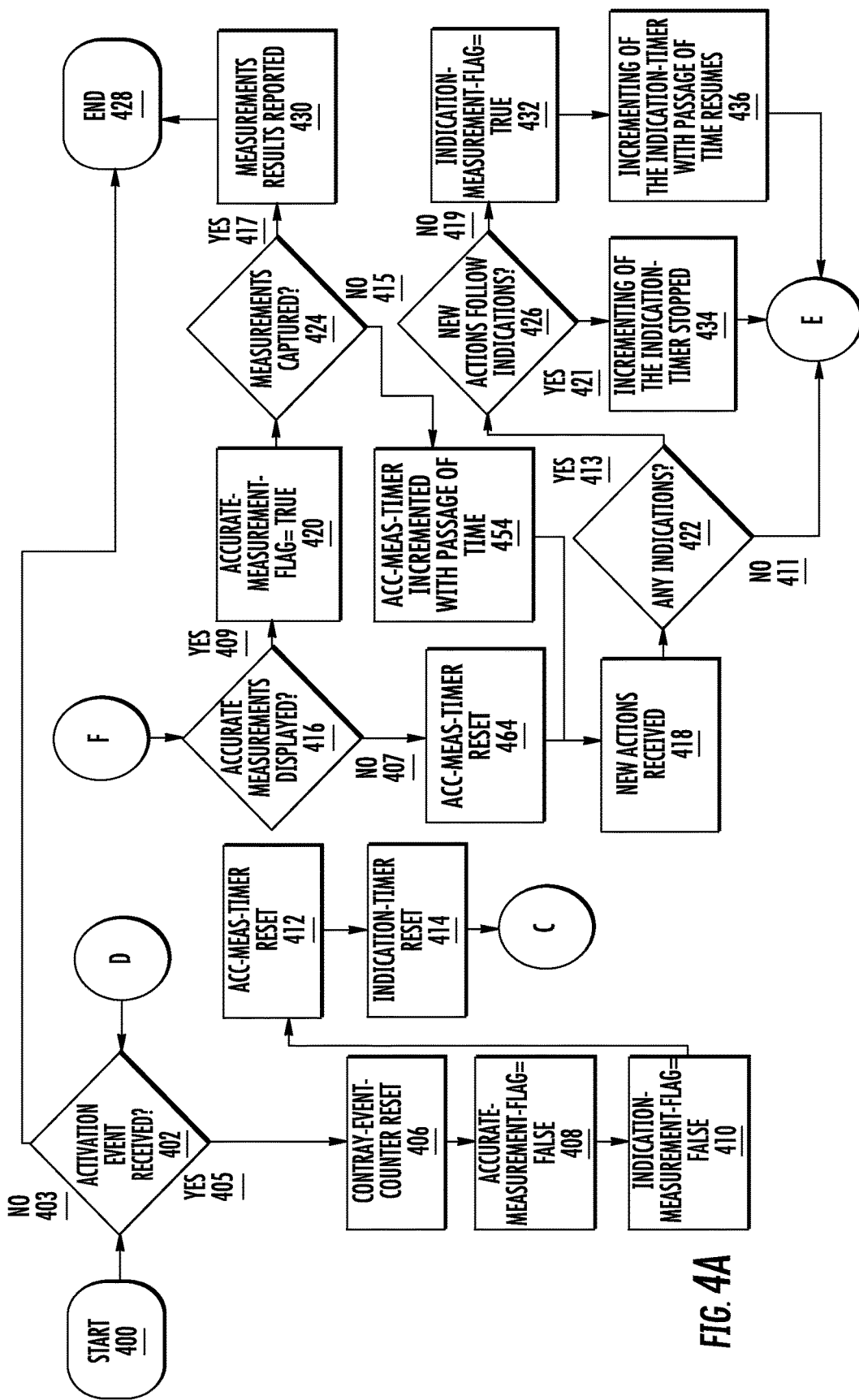
FIG. 4A and FIG. 4B are flow charts outlining the process for deactivating a device in accordance with embodiments of the disclosed subject matter in response to the detection of excessive measuring time and/or repetitive motion.
Figure 4B:
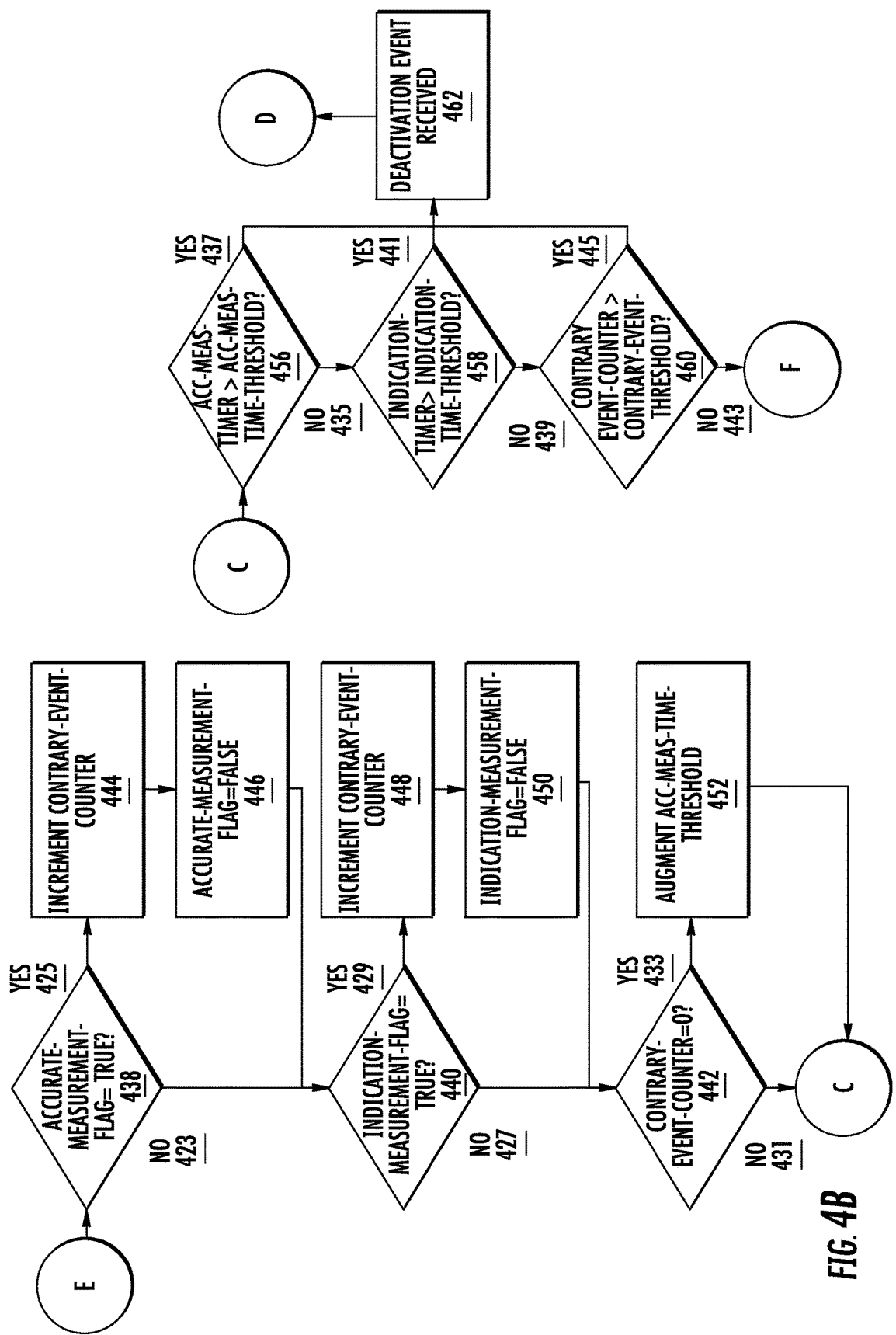

FIG. 4A and FIG. 4B represent an embodiment that combines elements of FIG. 2, FIG. 3A and FIG. 3B. FIG. 4A and FIG. 4B are flow charts outlining the process for deactivating a device in accordance with embodiments of the disclosed subject matter in response to the detection of excessive measuring time and/or repetitive motion.

The process begins in FIG. 4A at Step 400 followed by Step 402 in which a check is made to see if an activation event has been received by the mobile dimensioner device 100. If not (Path 403), then the process ends (Step 428). If an activation event has been received (Path 405), then the process continues.

As described earlier, there are different embodiments for the activation event, including but not limited to: a power on event, a power cycling event, an event that turns on the ability to take measurements, an event that turns on the communication interfaces, an event that resets existing measurements, an event that resets the mobile dimensioner device, and an event that includes a preliminary scan of the object.

Next, the mobile dimensioner device 100 then resets a counter used to track the number of times that a contrary event occurs, i.e. the contrary-event-counter (Step 406). The next steps in the process resets the accurate-measurement-flag (Step 408) which is used to track when an accurate measurement has been obtained. The indication-measurement-flag, which is used to track when indications for better measurements are not followed, is then reset (Step 410). Next, the mobile dimensioner device 100 resets the acc-meas-timer (Step 412), which is the timer used to track the amount of time that transpires before the mobile dimensioner device 100 derives an accurate measurement.

An additional timer, called the indication-timer, is then reset (Step 414). This timer is used to track the aggregate elapsed time that the mobile dimensioner device 100 spends in movements or measurements that are not aligned with the goal of obtaining better measurements for the subject being measured. The process then continues as indicated by connector C.

Connector C from FIG. 4A continues then in FIG. 4B. At this point, the mobile dimensioner device 100 then checks to see if the acc-meas-timer is greater than a specified threshold (Step 456). As described with earlier, the acc-meas-time-threshold may be set by the manufacturer, may be set to comply with certification standards, may be set in response to input or the like.

If the acc-meas-timer is less than or equal to the acc-meas-time-threshold (Path 435), i.e. the amount of time spent in obtaining and capturing an accurate measurement is not excessive, then the mobile dimensioner device 100 checks to see if the indication-timer is greater than a specified threshold (Step 458). This threshold is called the indication-time-threshold in FIG. 4B. Similar to the acc-meas-time-threshold, the indication-timer may be set by the manufacturer, may be set to comply with certification standards, may be set in response to input or the like.

If the indication-timer is less than or equal to the indication-time-threshold (Path 439), the mobile dimensioner device 100 then checks to see if the contrary-event-counter is greater than a specified threshold (Step 460). This threshold is called the contrary-event-threshold in FIG. 4B. As described earlier, the contrary-event-threshold may be set by the manufacturer, may be set to comply with certification standards, may be set by a server, may be set in response to input at the mobile dimensioner device 100, or may be set in some other manner.

If the contrary-event-counter is less than or equal to the contrary-event-threshold (Path 443), i.e. the number of times that a contrary event has occurred is less than or equal to the allowed number, then the process continues as indicated by connector F.

If the acc-meas-timer is greater than the acc-meas-time-threshold (Path 437), i.e. the amount of time spent in obtaining and capturing an accurate measurement is excessive, then the process continues to Step 462 where a deactivation event is received by the mobile dimensioner device 100. The process then continues as indicated by connector D.

If the indication-timer is greater than the indication-time threshold (Path 441), i.e. the aggregate elapsed time that the mobile dimensioner device 100 spends in movements or measurements that are not aligned with the goal of obtaining better measurements for the object being measured is greater than what is allowed, then the process continues to Step 462 where a deactivation event is received by the mobile dimensioner device 100. The process then continues as indicated by connector D.

If the contrary-event-counter is greater than the contrary-event-threshold (Path 445), i.e. the number of times that a contrary event has occurred is now greater than the allowed number, then the mobile dimensioner device 100 then the process continues to Step 462 where a deactivation event is received by the mobile dimensioner device 100. The process then continues as indicated by connector D.

As described earlier, there are different embodiments for the deactivation event, including but not limited to: a power off event, an event that turns off the ability to take measurements, an event that turns off sensors, an event that restricts the reporting of results, an event that turns off communication interfaces, an event that deactivates sensors and displays the last set of dimensions, an event that deactivates sensors and requires a device reset, and an event that deactivates and deletes the last set of dimensions.

Connector D of FIG. 4B then continues in FIG. 4A, where a check is made to see if an activation event has been received by the mobile dimensioner device 100 (Step 402), and if not (Path 403) then the process ends (Step 428).

Returning to Step 460, Connector F of FIG. 4B then continues in FIG. 4A where the mobile dimensioner device 100 checks to see if an accurate measurement has been derived and displayed (Step 416). If no accurate measurement has been obtained and displayed (Path 407), then the acc-meas-timer is reset (Step 464), and the mobile dimensioner device 100 receives new actions (Step 418). As described above, new actions are movements, measurements, or both.

Next, the mobile dimensioner device 100 checks to see if there are any indications for obtaining a better measurement of the object being measured (Step 422). If not (Path 411), then the process continues as indicated by the connector E. If there are indications (Path 413), then the mobile dimensioner device checks to see if the new actions followed or corresponded to the indications (Step 426). If the new actions follow the indications (Path 421), then the incrementing of the indication-timer with the passage of time, if it has been running, is stopped or paused (Step 434) and the process continues as indicated by connector E. If the new actions do not correspond to the indications (Path 419), then the indication-measurement-flag is set to TRUE (Step 432), the indication-timer is incremented with the passage of time (Step 436), and the process continues as indicated by connector E.

Connector E of FIG. 4A then continues in 4B. The mobile dimensioner device 100 first checks to see if the accurate-measurement-flag is TRUE. If it is not (Path 423), then the process continues. If it is (Path 425), then the contrary-event counter is incremented (Step 444) and the accurate-measurement-flag is reset to FALSE (Step 446), and the process continues. The mobile dimensioner device 100 then checks to see if the indication-measurement-flag is TRUE. If it is not (Path 427), then the process continues. If it is (Path 429), then the contrary-event counter is incremented (Step 448) and the indication-measurement-flag is reset to FALSE (Step 450), and the process continues.

The mobile dimensioner device 100 then checks to see if the number of contrary events is 0 (Step 442). If not (Path 431), then the process continues as indicated by connector C. If the number of contrary events is 0 (Path 433), then the acc-meas-time-threshold is augmented (Step 452), and the process continues as indicated by connector C. The augmentation of the acc-meas-time-threshold effectively rewards movements and measurements by the mobile dimensioner device 100 that are aligned with the goal of obtaining better measurements for the subject being measured by giving more time to derive an accurate measurement. Connector C from FIG. 4B then continues in FIG. 4A, as described above.

Returning to Step 416, if an accurate measurement has been derived and displayed (Path 409), then the accurate-measurement-flag is set to TRUE (Step 420), and then the mobile dimensioner device checks to see if the measurement has been captured (Step 424). As described earlier, in some embodiments, the measurement may be captured in response to input at the mobile dimensioner device 100, or may be set in some other manner. If the measurement is captured (Path 417), then the measurement results are reported (Step 430) and the process is complete (Step 428). If the measurement is not captured (Path 415), then the clock system 130 of the mobile dimensioner device 100 increments the acc-meas-timer with the passage of time (Step 454), and the process then continues to Step 418 where new actions are received by the mobile dimensioner device 100. In alternative embodiments, once the clock system 130 of the mobile dimensioner device 100 increments the acc-meas-timer with the passage of time (Step 454), the process continues as indicated by connector C. In this embodiment, similar to FIG. 2, once the mobile dimensioner device 100 has an accurate measurement, it must be captured or the device will deactivate.

In this manner, FIGS. 4A and 4B describe a use case where, for a mobile dimensioner device 100 that may or may not display an accuracy dimension, if there are indications for getting an accurate measurement and they are ignored in sufficient quantity and/or duration, or if accurate measurements are derived but not captured after a certain number of times or within a certain time period, then the mobile dimensioner device 100 will be deactivated.

Figure 5A:
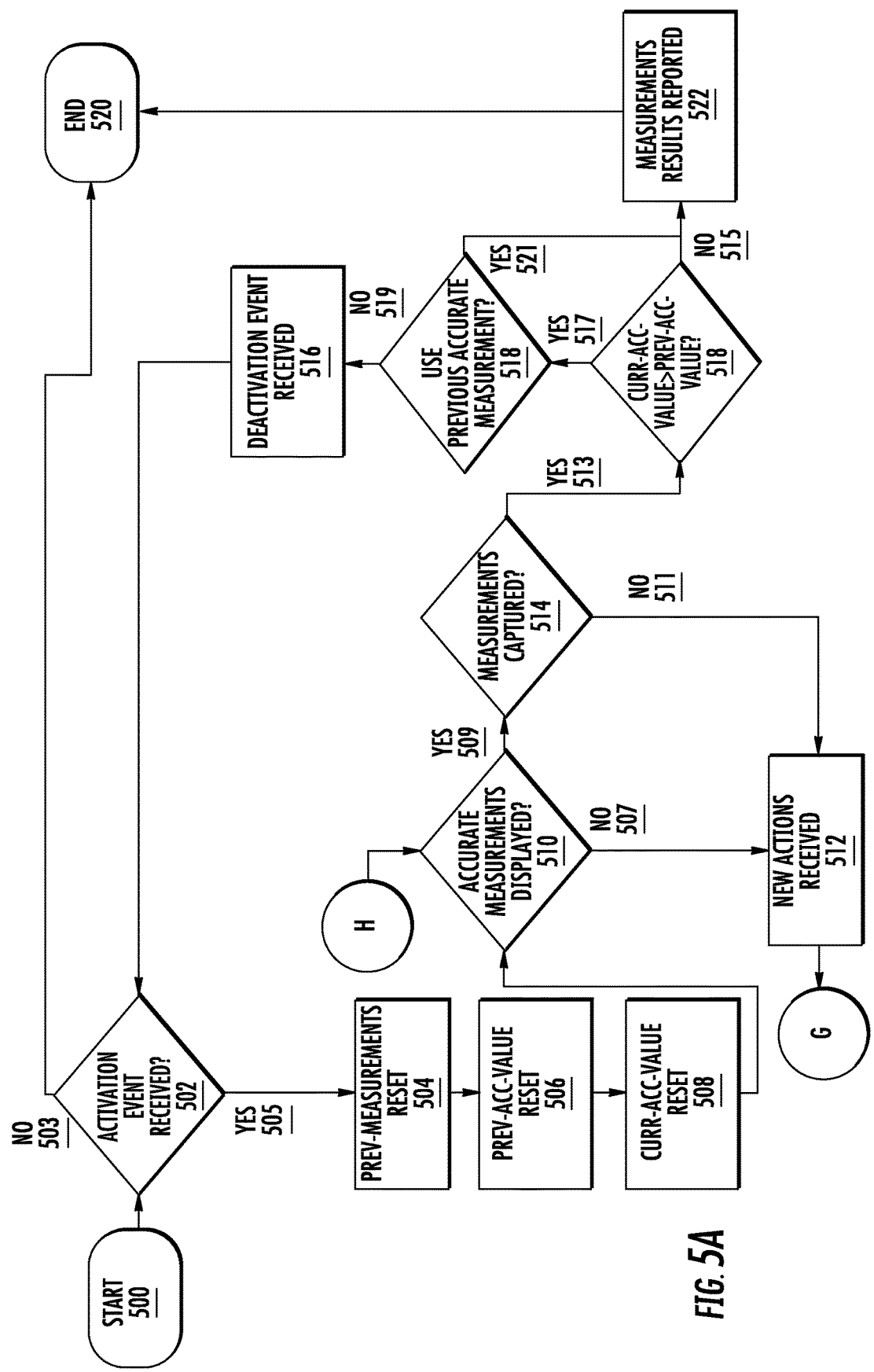
FIG. 5A and FIG. 5B are flow charts outlining the process for deactivating a device in accordance with embodiments of the disclosed subject matter involving the accuracy dimension.
Figure 5B:
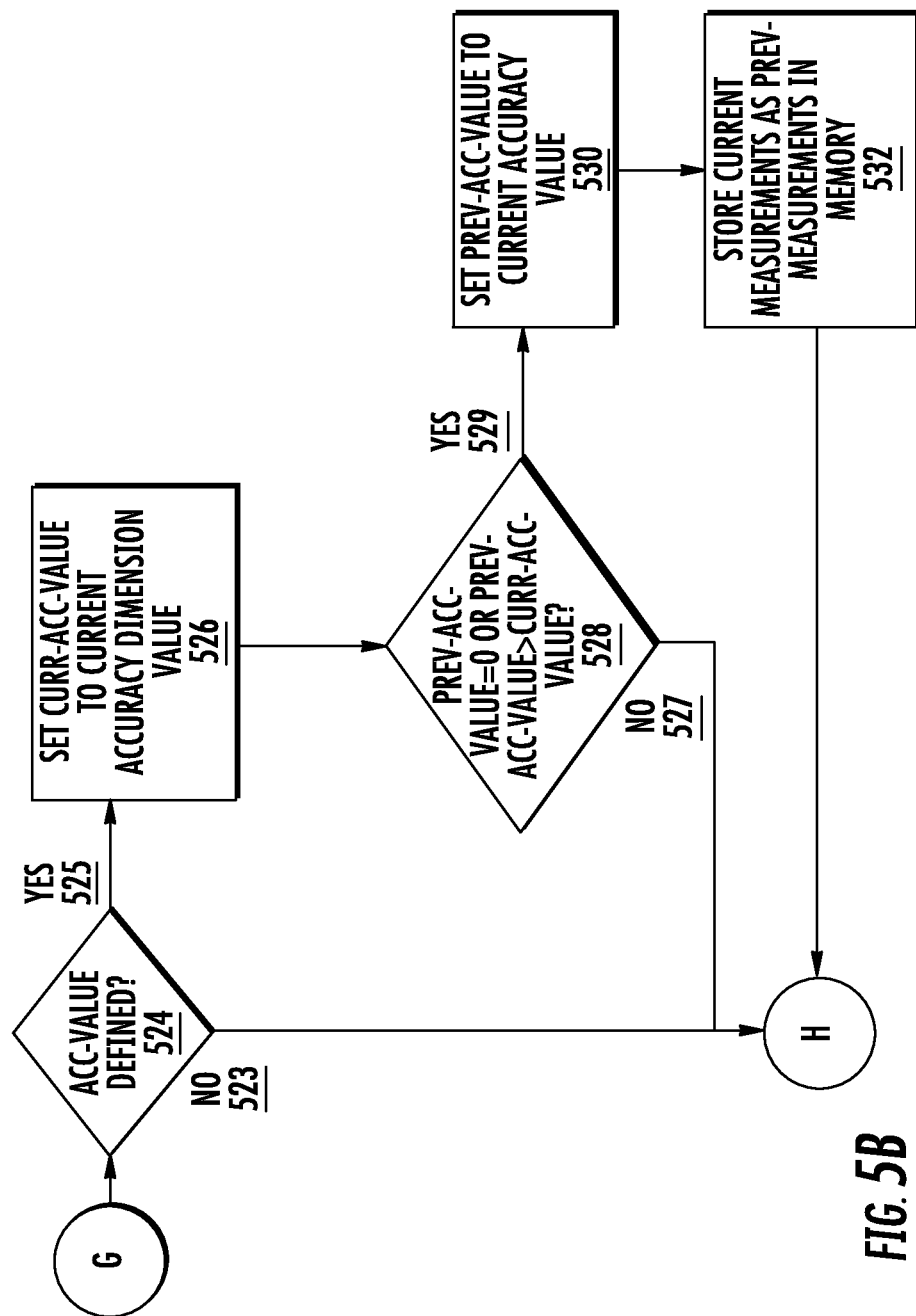

FIG. 5A and FIG. 5B are flow charts outlining the process for deactivating a device in accordance with embodiments of the disclosed subject matter involving the accuracy dimension. The process begins in FIG. 5A at Step 500 followed by Step 502 in which a check is made to see if an activation event has been received by the mobile dimensioner device 100. If not (Path 503), then the process ends (Step 520). If an activation event has been received (Path 305), then the process continues.

As described earlier, there are different embodiments for the activation event, including but not limited to: a power on event, a power cycling event, an event that turns on the ability to take measurements, an event that turns on the communication interfaces, an event that resets existing measurements, an event that resets the mobile dimensioner device, and an event that includes a preliminary scan of the object.

The mobile dimensioner device 100 first resets a variable used to store the previous measurements taken by the mobile dimensioner device 100 (Step 504). This is the prev-measurement variable in FIG. 5A. The mobile dimensioner device then resets a variable used to store the accuracy dimension (i.e. the "d" value) for the previous set of measurements taken by the mobile dimensioner device (Step 506). This is the prev-acc-value variable in FIG. 5A. The last variable reset by the mobile dimensioner device 100 is the curr-acc-value (Step 508), which is used to store the accuracy dimension of the current set of measurements taken by the mobile dimensioner device 100. Note, in some embodiments, these single variables may be implemented as separate but related variables having the attributes described herein.

Next, the mobile dimensioner device 100 checks to see if an accurate measurement has been derived and displayed (Step 510). If no accurate measurement has been derived and displayed yet (Path 507), then the mobile dimensioner device 100 receives new actions (Step 512). As described above, new actions are movements, measurements, or both. The process then continues as indicated by connector G.

Connector G in FIG. 5A continues in FIG. 5B. The mobile dimensioner device 100 then checks to see if the accuracy dimension for the current measurement is defined (Step 524). If not (Path 523), then the process continues as indicated by connector H. If the accuracy dimension is defined (Path 525), then the mobile dimensioner device 100 sets the curr-acc-value variable to the value of the accuracy dimension of the current measurement (Step 526). The mobile dimensioner device 100 then checks to see if the prev-acc-value variable is 0 or if the prev-acc-value variable is greater than the curr-acc-value variable (Step 528). If not (Path 527), then the process continues as indicated by connector H. If so (Path 529), then the mobile dimensioner device 100 sets the prev-acc-value variable to the curr-acc-value variable (Step 530) and sets the prev-measurements variable to the value of the current measurements (Step 532). The process then continues as indicated by connector H.

Connector H of FIG. 5B then continues in FIG. 5A. If an accurate measurement has been obtained and displayed (Path 509), then the mobile dimensioner device 100 checks to see if the measurement has been captured (Step 514). In some embodiments, the measurement may be captured in response to input at the mobile dimensioner device 100, or may be set in some other manner. If the measurement is not captured (Path 511), then the mobile dimensioner device 100 receives new actions (Step 512) as described above. If the measurement is captured (Path 513), then the mobile dimensioner device 100 checks to see if the curr-acc-value variable exceeds the prev-acc-value variable (Step 518), i.e. is the mobile dimensioner device 100 attempting to capture a measurement with less accuracy (a large accuracy dimension "d" value) after having previously obtained a measurement with more accuracy (a small accuracy dimension "d" value). If not (Path 515), then the measurement results are reported (Step 522) and the process is complete (Step 520). If so (Path 517), then the mobile dimensioner device 100 checks to see if it should use the previous accurate measurements stored in the prev-measurements variable (Step 518). If so (Path 521), then again, the measurement results are reported (Step 522). If not, then a deactivation event is received by the mobile dimensioner device 100, and the mobile dimensioner device returns to a state where it waits for an activation event (Step 502).

As described earlier, deactivation events may be a power off event, an event requiring a reset, an event that turns off the ability to take measurements, an event that clears out any active measurements, an event restricting the ability to report the results, or any combination therein.

In this manner, FIGS. 5A and 5B describe a use case where, for a mobile dimensioner device 100 that displays an accuracy dimension, once a measurement with a greater accuracy has been taken (i.e. a small accuracy dimension "d" value), the mobile dimensioner device 100 is prevented from reporting measurements with less accuracy (i.e. a large accuracy dimension "d" value).

In this respect, the processes described in FIG. 2, FIG. 3A & FIG. 3B, FIG. 4A & FIG. 4B, and FIG. 5A & FIG. 5B should make it clear to a person of ordinary skill in the art how the mobile dimensioner device 100 of the present invention detects excessive measuring time and/or a repetitive range of motion and receives a deactivation event upon detection of these activities in an attempt to mitigate the risk of systematic reporting of improper measurements designed to defraud customers and shippers.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,463,079;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;

U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
U.S. Pat. No. 8,854,633;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0202702;
U.S. Patent Application Publication No. 2010/0220894;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;

U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0267609;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTI-FUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile dimensioner device, comprising:
a display;
one or more optical sensors;
one or more measurement sensors;
an input subsystem;
one or more processors; and
memory containing instructions executable by the one or more processors whereby the device is operable to:
receive a threshold number of contrary events;
activate at least one of the one or more measurement sensors;
derive a first set of dimensions for an object and an associated indication of the dimensional accuracy of each of the dimensions based on information received from the one or more measurement sensors;
display, on the display, the first set of dimensions and the associated indication of the dimensional accuracy of each of the dimensions;
display, on the display, an indication to obtain a better measurement of the object;
detect a number of contrary events;
if the number of contrary events detected exceeds the threshold number of contrary events, receive a deactivation event and deactivate the device in accordance with the deactivation event.

2. The device of claim 1, wherein the device is further operable to:
derive a set of preliminary dimensions for an object based on information received from the one or more measurement sensors.

3. The device of claim 1, wherein the contrary event is an action that does not correspond to an indication to obtain a better measurement of the object.

4. The device of claim 1, wherein the threshold number of contrary events is defined by one of the group consisting of: defined by the manufacturer of the device, defined to comply with certification standards set by a certification organization, defined in response to input received via the input subsystem at the device, and defined in response to information received at the device from a server.

5. The device of claim 1, wherein the deactivation event is selected from the group consisting of: a power off event for the device, an event that turns off the ability of the device to take measurements, an event that turns off the one or more measurement sensors of the device, an event that restricts the ability of the device to report results, an event that turns off one or more communication interfaces of the device, an event that deactivates the measurement sensors and displays the first set of dimensions, an event that deactivates the measurement sensors and places the device in a state requiring reset, and an event that deactivates the measurement sensors and deletes the first set of dimensions.

6. The device of claim 1, wherein the one or more optical sensors is selected from a group consisting of: a barcode sensor, a camera, and an image sensor.

7. The device of claim 1, wherein the one or more measurement sensors is selected from a group consisting of: point-cloud projection, structured light, and stereoscopic cameras and n-scopic cameras.

* * * * *